(12) United States Patent
Yaguchi et al.

(10) Patent No.: US 10,458,500 B2
(45) Date of Patent: Oct. 29, 2019

(54) FRICTION MATERIAL

(71) Applicant: NISSHINBO BRAKE INC., Tokyo (JP)

(72) Inventors: Mitsuaki Yaguchi, Gunma-ken (JP); Shinya Kaji, Gunma-ken (JP)

(73) Assignee: Nisshinbo Brake Inc., Tokyo (JP)

( * ) Notice: Subject to any disclaimer, the term of this patent is extended or adjusted under 35 U.S.C. 154(b) by 0 days.

(21) Appl. No.: 15/186,385

(22) PCT Filed: Dec. 2, 2014

(86) PCT No.: PCT/JP2014/081821
§ 371 (c)(1),
(2) Date: Jun. 17, 2016

(87) PCT Pub. No.: WO2015/098434
PCT Pub. Date: Feb. 7, 2015

(65) Prior Publication Data
US 2016/0356332 A1 Dec. 8, 2016

(30) Foreign Application Priority Data
Dec. 24, 2013 (JP) .................. 2013-265396

(51) Int. Cl.
| | | |
|---|---|---|
| F16D 69/02 | (2006.01) |
| C08L 61/14 | (2006.01) |
| C08K 3/22 | (2006.01) |
| C08K 3/30 | (2006.01) |
| C08K 3/32 | (2006.01) |
| C08K 7/06 | (2006.01) |
| C08L 61/06 | (2006.01) |
| C08L 61/34 | (2006.01) |
| C08L 77/10 | (2006.01) |
| C08K 3/04 | (2006.01) |

(52) U.S. Cl.
CPC ............ *F16D 69/026* (2013.01); *C08K 3/042* (2017.05); *C08K 3/22* (2013.01); *C08K 3/30* (2013.01); *C08K 3/32* (2013.01); *C08K 7/06* (2013.01); *C08L 61/06* (2013.01); *C08L 61/14* (2013.01); *C08L 61/34* (2013.01); *C08L 77/10* (2013.01); *C08L 2205/02* (2013.01); *C08L 2205/06* (2013.01); *F16D 2200/006* (2013.01); *F16D 2200/0065* (2013.01); *F16D 2200/0086* (2013.01)

(58) Field of Classification Search
CPC ........ F16D 69/02; F16D 69/026; C08L 61/41; C08L 77/10; C08L 61/34; C08L 61/06; C08L 61/14; C08K 3/042; C08K 7/06; C08K 3/32; C08K 3/30
USPC ........................ 523/156; 192/107; 264/37.33
See application file for complete search history.

(56) References Cited

U.S. PATENT DOCUMENTS

| | | | | |
|---|---|---|---|---|
| 3,896,075 | A * | 7/1975 | Longley ................... | C08K 7/10 106/36 |
| 5,339,931 | A * | 8/1994 | Jacko ..................... | F16D 65/125 106/36 |
| 5,969,001 | A * | 10/1999 | Kawai ................... | F16D 23/025 192/107 M |
| 6,220,405 | B1 * | 4/2001 | Kesavan ............... | F16D 69/025 188/250 G |
| 6,481,555 | B1 * | 11/2002 | Hell ...................... | F16D 69/026 188/251 A |
| 2004/0089512 | A1 * | 5/2004 | Marchisseau ....... | B29C 45/0005 192/107 M |
| 2004/0242432 | A1 | 12/2004 | Suzuki et al. | |
| 2006/0105920 | A1 * | 5/2006 | Dalman ............... | C10M 169/04 508/110 |
| 2010/0331447 | A1 | 12/2010 | Schoo et al. | |
| 2013/0228403 | A1 | 9/2013 | Kikudome et al. | |

FOREIGN PATENT DOCUMENTS

| | | |
|---|---|---|
| JP | 2009-155439 | 7/2009 |
| JP | 2007-326999 | 12/2012 |
| KR | 20100127968 | 12/2010 |

OTHER PUBLICATIONS

Superior Graphite, Resilient Graphitic Carbons, 2008.*

* cited by examiner

*Primary Examiner* — Doris L Lee
(74) *Attorney, Agent, or Firm* — R. Lynette Wylie; Apex Jurls, pllc.

(57) ABSTRACT

The present invention provides a friction material for a disc brake pad, which is able to suppress chipping of an edge of the friction material that occurs under the high speed and high load braking conditions and further to suppress the deterioration of the braking effectiveness under the high speed and high load braking conditions while satisfying laws and regulations relating to the required amount of the content of the copper component. A friction material composition that contains 0.5-10 weight % of a resilient graphitic carbon particle relative to the total amount of the friction material composition as a carbon type lubricant and contains the total amount of a copper component contained in the friction material composition is less than 5 weight % relative to the total amount of the friction material composition.

2 Claims, No Drawings

FRICTION MATERIAL

DETAILED DESCRIPTION

Field of Invention

This invention relates to a friction material for a disc brake pad of an automobile or the like, which is manufactured by forming a non-asbestos-organic (NAO) friction material composition.

Background Of Invention

Conventionally, a disc brake is used as a brake device of an automobile, and a disc brake pad manufactured by fixing the friction material on a metallic base member is used as a friction member of the disc brake.

The friction material is classified into three types, i.e., a semi-metallic friction material containing, as a fiber base material, 30 weight % or more but less than 60 weight % of a steel fiber relative to the total amount of the friction material composition, a low steel friction material containing a steel fiber in a part of the fiber base material as well as less than 30 weight % of the steel fiber relative to the total amount of the friction material composition, and the NAO friction material containing no steel-based fiber such as the steel fiber and a stainless steel fiber.

The friction material causing less braking noise is demanded late years, it is a recent trend to use the disc brake pad that uses the NAO friction material that does not contain the steel fiber and/or the steel-based fiber but mainly contains such as a binder, a fiber base material, a lubricant, a titanate, an inorganic friction modifier, an organic friction modifier, pH adjuster, and a filler.

For the NAO friction material for the disc brake pad, in order to secure the required performance, about 5-20 weight % of a copper component such as fibers and/or particles of copper and/or copper alloy in total relative to the total amount of the friction material composition, is added as a necessary component.

However, recently, the above-described friction material, when braking, discharges the copper as abrasion powder, and it is suggested that the discharged copper flows in a river, lake, and/or ocean and then the copper possibly contaminates an area around the discharged copper.

Because of these background, for example, California State (CA) and Washington State (WA) of the United States of America passed a bill to prohibit the sales of the friction member using the friction material containing 5 weight % or more of the copper component relative to the total amount of the friction material composition and an act of assembling the subject friction material in a new car from the year of 2021, and the sales of the friction member using the friction material containing 0.5 weight % or more of the copper component relative to the total amount of the friction material composition and an act of assembling the subject friction material in a new car several years later from above year of 2021.

Then, as this type of laws and regulations is expected to be spread out in the world from now on, the elimination of the copper component contained in the NAO friction material is urgently needed, and an issue is to suppress the chipping of an edge of the friction material that occurs under the high speed and high load braking conditions.

The Patent Document 1 discloses the friction material, which is manufactured by forming the friction material composition containing 0.5-50 weight % of the metallic tin or tin alloy relative to the total amount of the friction material composition and 0.001-4.999 weight % of the copper relative to the total amount of the friction material composition However, the friction materials disclosed in the Patent Document 1 satisfies the laws and regulations relating to the required amount of the content of the copper component contained therein but cannot be said to solve the problem of a chipping of the edge of the friction material that occurred under the high speed and high load braking conditions.

The Patent Document 2 discloses the non-asbestos friction material comprising a fiber base, a friction modifier, and a binder, which containing 0.5-2.5 volume % of a partial graphitized cokes. The Patent Document 3 discloses the friction material comprising a fiber base, a binder, and a filler, which containing a resilient graphite as the filler and further not containing an organic dust. However, neither Patent Document discuss the problem of the chipping of the edge of the friction material that occurred under the high speed and high load braking conditions.

PRIOR ARTS

Patent Documents

US Provisional Patent Publication No. 2010/0331447
Japanese Provisional Patent Publication No. 2007-326999
Japanese Provisional Patent Publication No. 2009-155439

SUMMARY OF INVENTION

Problems to be Resolved the Invention

An object of this invention is to provide a friction material manufactured by forming a non-asbestos-organic (NAO) friction material composition, which is used for a disc brake pad, in which the friction material is able to suppress chipping of an edge of the friction material that occurs under the high speed and high load braking conditions while satisfying laws and regulations relating to the required amount of the content of the copper component contained therein.

Means to Resolve the Problems

The inventors, after serious investigation, completed this invention as finding that the above-identified problem may be resolved by using the friction material composition which contains the predetermined amount of the resilient graphitic carbon particle as the carbon type lubricant in the friction material which is manufactured by forming the NAO friction material composition used for the disc brake pad, in which the friction material composition contains less than 5 weight % of the copper component relative to the total amount of the friction material composition and then the problem of deterioration of braking effectiveness under the high speed and high load braking conditions that occurs upon adding the resilient graphitic carbon particle may be suppressed by using the friction material composition which adds the predetermined amount of a ferrous sulfide as a metal sulfide type lubricant, and one or combination of two or more items selected from the group consisting of an aluminum particle, an aluminum fiber, an alloy particle mainly containing aluminum, an alloy fiber mainly containing aluminum as an inorganic friction modifier to the above described friction material composition containing the predetermined amount of the resilient graphitic carbon particle.

This invention relates to a friction material utilized for a disc brake pad, which is manufactured by forming the NAO friction material composition and is based on the following technology.

(1) The friction material which is a non-asbestos-organic (NAO) friction material utilized for a disc brake pad, which is manufactured by forming a non-asbestos organic friction material composition containing a copper component of less than 5 weight % in total relative to the total amount of the friction material composition, wherein said friction material composition contains 0.5-10 weight % of a resilient graphitic carbon particle relative to the total amount of the friction material composition as the carbon type lubricant.

(2) The friction material according to the friction material of (1), wherein said friction material composition contains 1-15 weight % of the ferrous sulfide relative to the total amount of the friction material composition as a metal sulfide type lubricant.

(3) The friction material according to the friction material of (2), wherein said friction material composition contains 1-10 weight % of one or any combination of two or more items selected from the group consisting of an aluminum particle, an aluminum fiber, an alloy particle mainly containing aluminum, and an alloy fiber mainly containing aluminum relative to the total amount of the friction material composition as an inorganic friction modifier.

Advantage of the Invention

The present invention, with respect to the friction material utilized for a disc brake pad, which is manufactured by forming the non-asbestos organic friction material composition, can provide the friction material which is able to suppress chipping of an edge of the friction material that occurs under the high speed and high load braking conditions and further to suppress the deterioration of the braking effectiveness under the high speed and high load braking conditions while satisfying laws and regulations relating to the amount of the content of the copper component.

EMBODIMENT OF THE INVENTION

In the present invention, with respect to the friction material utilized for a disc brake pad which is a non-asbestos-organic (NAO) friction material, which is manufactured by forming a friction material composition containing a copper component of less than 5 weight % in total relative to the total amount of the friction material composition, the friction material composition contains 0.5-10 weight % of the resilient graphitic carbon particle relative to the total amount of the friction material composition as the carbon type lubricant.

The resilient graphitic carbon particle has a characteristic of showing a higher recovery ratio of the volume thereof when removing the added compressive load, and such resilient graphitic carbon particle is made by expanding and forming a carbonaceous mesophase or cokes and then graphitizing at 1900-2700 centigrade to make the graphitization degree of 80-95% according to the X-ray analysis.

A process of expanding and foaming may be such as (1) a method of acid treating the carbon material with nitric acid or mixed acid of nitric acid and sulfuric acid; dissolving in the alkali aqueous solution; extracting in nitric acid solution to obtain an aqua mesophase; and finally heating the aqua mesophase at about 300 centigrade, (2) a method of heating the carbon material rapidly by contacting the same nitric acid to rapidly heat the same, and (3) a method of contacting the carbon material with nitrogen dioxide gas.

As the friction material composition after adding the resilient graphitic carbon particle is heat press formed, while compressive load is being applied to the resilient graphitic carbon particle, the thermosetting resin contained in the friction material composition functioning as a binder is cured to form an outline of the friction material. As a result, the inside of the friction material is maintained the condition where a recovering force of the resilient graphitic carbon particle is maintained therein.

The chipping of an edge of the friction material that occurs under the high speed and high load braking conditions is presumed to be generated based on cracks caused because of pores that are formed by decomposing the organic substance contained in the friction material because of the high temperature of the friction material due to the own friction heat caused by the high speed and high load breaking.

The friction material containing the resilient graphitic carbon particle is such that the resilient graphitic carbon particle with an effective recovering force functions to fill in the pores therearound to suppress the causation of the cracks that are the causes of the chipping.

Because the resilient graphitic carbon particle is a carbon type lubricant and has high lubricating ability, there is a problem of the deterioration of the braking effectiveness under the high speed and high load braking conditions when the large amount of the resilient graphitic carbon particle is added to the friction material composition in order to suppress the causes of the chipping.

Accordingly, the present invention, so as to suppress the aforementioned deterioration of the braking effectiveness under the high speed and high load braking conditions, 1-15 weight % of a ferrous sulfide relative to the total amount of the friction material composition as a metal sulfide type lubricant is also added. Furthermore, 1-10 weight % of one or any combination of two or more items selected from the group consisting of an aluminum particle, an aluminum fiber, an alloy particle mainly containing aluminum, and an alloy fiber mainly containing aluminum relative to the total amount of the friction composition as the inorganic friction modifier, are contained in added.

In the normal using range of the brake, the ferrous sulfide acts as a lubricant, and for the purpose of improving the braking effectiveness under the high speed and high load braking conditions in the present invention, the ferrous sulfide acts as the friction modifier.

Also, the aluminum and the alloy mainly containing aluminum act as the friction modifier in order to improve the braking effectiveness by causing an adhesive friction under the high speed and high load braking conditions.

As the alloy mainly containing aluminum, the alloy containing 90% or more of aluminum such as aluminum-zinc type alloy, aluminum-copper type alloy, aluminum-manganic type alloy, aluminum-silicon type alloy, aluminum-magnesium type alloy, aluminum-magnesium-silicon type alloy, aluminum-zinc-magnesium type alloy may be utilized.

If the aluminum-copper type alloy is needed to be used, the total amount of the copper component is designed to be less than 5 weight % relative to the total amount of the friction material composition.

In addition, in a view of reducing the environmental impact or load, the copper component is preferably not included in the friction material composition.

In the present invention, the friction material is made from the friction material composition containing the above-described resilient graphitic carbon particle, the ferrous sulfide, the aluminum particle, the alloy particle mainly containing aluminum, the aluminum fiber, the alloy fiber mainly containing aluminum as well as the binder, the fiber base material, the titanate, the lubricant, the inorganic friction modifier, the inorganic friction modifier, pH adjusting agent, and the filler normally used for the friction material.

The binder may be one or any combination of two or more of the conventionally used material for the friction material binder such as a straight phenolic resin, a resin modified by a cashew oil, a silicone oil, or various elastomers such as an acrylic rubber, an aralkyl modified phenolic resin obtained by reacting the phenolic compound, an aralkyl ethyl compound, and an aldehyde compound, a thermosetting resin dispersing such as various elastomer or fluoropolymer in the phenolic resin. The amount of the binder contained therein is preferably 4-12 weight %, more preferably 5-8 weight % relative to the total amount of the friction material composition.

The fiber base material may be one or any combination of two or more of the conventionally used organic fiber for the friction material containing such as an aramid fiber, a cellulose fiber, a poly-phenylene-benzobisoxazole (PBO) fiber, and/or an acrylic fiber. The amount of the fiber base material contained therein is preferably 1-7 weight %, more preferably 2-4 weight % relative to the total amount of the friction material composition.

The titanate is preferably in a plate like or indefinite shape having multiple convex portions and may be one or any combination of two or more of the conventionally used titanate for the friction material containing such as a potassium titanate, a lithium potassium titanate, and a magnesium potassium titanate. The amount of the titanate contained in the friction material composition is preferably 7-35 weight %, more preferably 17-25 weight % relative to the total amount of the friction material composition.

For the lubricant, other than the above-described resilient graphitic carbon particle, the ferrous sulfide, the lubricant may be one or any combination of two or more of the lubricant conventionally used for the friction material such as the metal sulfide type lubricant such as a molybdenum disulfide, a zinc sulfide, a tin sulfide, an and a composite metal sulfide and the carbon type lubricant such as an artificial graphite, a natural graphite, a petroleum coke, an activated carbon, and a polyacryonitrile oxidized fiber pulverized powder. The amount of the lubricant contained in the friction material composition is preferably 2-21 weight %, more preferably 4-17 weight % relative to the total amount of the friction material composition.

Also, the resilient graphitic carbon particle may be such as RGC14A of Superior Graphite Co.

For the inorganic friction modifier, other than the above-described aluminum particle, aluminum fiber, alloy particle mainly containing aluminum, and alloy fiber mainly containing aluminum, the inorganic friction modifier may be one or any combination of two or more of the particle inorganic friction modifier such as a talc, a mica, a vermiculite, a triiron tetroxide, a calcium silicate hydrate, a glass bead, a magnesium oxide, a zirconium oxide, a zirconium silicate, γ-alumina, α-alumina, and a silicon carbide and a fiber inorganic friction modifier such as a wollastonite, the sepiolite, the basalt fiber, the glass fiber, the biosoluble artificial mineral fiber, and the rock wool, and one or any combination of two or more of the above may be used. The amount of the inorganic friction modifier contained therein, together with the above-described aluminum particle, alloy particle mainly containing the aluminum, aluminum fiber, and alloy fiber mainly containing the aluminum, is preferably 15-50 weight %, more preferably 20-45 weight % relative to the total amount of the friction material composition.

The organic friction modifier may be one or any combination of two or more of the organic friction modifiers conventionally used for the friction material such as a cashew dust, a pulverized powder of tire tread rubber, a vulcanized or an unvulcanized rubber powder of such as a nitrile rubber, an acrylic rubber, a silicone rubber, and a butyl rubber. The amount of the organic friction modifier contained therein is preferably 3-8 weight %, more preferably 4-7 weight % relative to the total amount of the friction material composition.

A calcium hydroxide which is conventionally utilized for the friction material may be used as the pH adjusting agent. The amount of the pH adjusting agent is preferably 2-6 weight %, more preferably 2-3 weight % relative to the total amount of the friction material composition.

As the reminders of the friction material composition, filler such as a barium sulfate and a calcium carbonate may be used.

The friction material of this invention used in the disc brake is manufactured through the mixing step of uniformly mixing the predetermined amount of friction material composition oriented therein using a mixer, the heat press forming step of heat press forming the obtained raw friction material mixture positioned in the heat forming die superposed on the separately pre-cleaned, surface treated, and adhesive applied back plate, the heat treatment step of heating the obtained molded product to complete the cure reaction of the binder, the electrostatic powder coating step of coating the powder coating thereon, the baking step of baking the coating, and the grinding step of forming the friction surface by the rotary grinding wheel. Also, after the heat press forming step, the heat treatment step performing both the coating step and baking step may be replaced before the grinding step.

As necessary, prior to the heat press forming step, the granulation step of granulating the raw friction material mixture, the kneading step of kneading the raw friction material, and the pre-forming step of forming an unfinished preformed article by positioning the raw friction material mixture or the granulation obtained through the granulation step and the kneaded article obtained through the kneading step into the pre-forming die, are performed, and after the heat press forming step, the scorching step is performed.

Embodiment

In the following sections, the embodiments and the comparative examples are shown; however, this invention is not limited to the embodiments described below.

[Manufacturing Method for Friction Material in Embodiments 1-14 and Comparative Examples 1-3]

The friction material composition shown in TABLE 1 and TABLE 2 is mixed for 5 minutes by the Loedige mixer and is pressed in the forming die under 30 MPa for 10 seconds to perform the preforming. This preforming product is superposed on the pre-cleaned, surface treated, adhesive coated steel back plate to form for 10 minutes in the heat forming die at the forming temperature of 150 centigrade under the forming pressure of 40 MPa, to heat treatment (post-curing) for 5 hours at 200 centigrade, and to grind to form the friction surface for the disc brake pad of the automotive (Embodiments 1-14 and Comparative Examples 1-3).

TABLE 1

| | Embodiments | | | | | | | | |
|---|---|---|---|---|---|---|---|---|---|
| | 1 | 2 | 3 | 4 | 5 | 6 | 7 | 8 | 9 |
| Aralkyl Modified Phenolic Resin (Phenol Aralkyl resin) | 4.0 | 4.0 | 4.0 | 4.0 | 4.0 | 4.0 | 4.0 | 4.0 | 4.0 |
| Straight Phenolic Resin | 3.0 | 3.0 | 3.0 | 3.0 | 3.0 | 3.0 | 3.0 | 3.0 | 3.0 |
| Copper Fiber | 3.0 | 0.0 | 0.0 | 0.0 | 0.0 | 0.0 | 0.0 | 0.0 | 0.0 |
| Aramid Fiber | 3.0 | 3.0 | 3.0 | 3.0 | 3.0 | 3.0 | 3.0 | 3.0 | 3.0 |
| Ferrous Sulfide | 0.0 | 5.0 | 5.0 | 5.0 | 5.0 | 5.0 | 0.5 | 1.0 | 15.0 |
| Molybdenum Disulfide | 5.0 | 0.0 | 0.0 | 0.0 | 0.0 | 0.0 | 0.0 | 0.0 | 0.0 |
| Resilient Graphitic Carbon | 1.0 | 0.5 | 2.0 | 3.0 | 5.0 | 10.0 | 3.0 | 3.0 | 3.0 |
| Petroleum Coke | 0.0 | 0.0 | 0.0 | 0.0 | 0.0 | 0.0 | 0.0 | 0.0 | 0.0 |
| Graphite | 2.0 | 2.0 | 2.0 | 2.0 | 2.0 | 2.0 | 2.0 | 2.0 | 2.0 |
| Potassium Hexatitanate (Indefinite Shape) | 17.0 | 17.0 | 17.0 | 17.0 | 17.0 | 17.0 | 17.0 | 17.0 | 17.0 |
| Aluminum Particle | 0.0 | 3.0 | 3.0 | 3.0 | 3.0 | 3.0 | 0.0 | 0.0 | 0.0 |
| Aluminum - Zinc Alloy Particle | 0.0 | 0.0 | 0.0 | 0.0 | 0.0 | 0.0 | 0.0 | 0.0 | 0.0 |
| Zirconium Oxide | 25.0 | 25.0 | 25.0 | 25.0 | 25.0 | 25.0 | 25.0 | 25.0 | 25.0 |
| Triiron Tetroxide | 7.0 | 7.0 | 7.0 | 7.0 | 7.0 | 7.0 | 7.0 | 7.0 | 7.0 |
| Zirconium Silicate | 1.0 | 1.0 | 1.0 | 1.0 | 1.0 | 1.0 | 1.0 | 1.0 | 1.0 |
| Mica | 4.0 | 4.0 | 4.0 | 4.0 | 4.0 | 4.0 | 4.0 | 4.0 | 4.0 |
| Pulverized Powder of Tire Tread Rubber | 2.0 | 2.0 | 2.0 | 2.0 | 2.0 | 2.0 | 2.0 | 2.0 | 2.0 |
| Cashew Dust | 5.0 | 5.0 | 5.0 | 5.0 | 5.0 | 5.0 | 5.0 | 5.0 | 5.0 |
| Calcium Hydroxide | 3.0 | 3.0 | 3.0 | 3.0 | 3.0 | 3.0 | 3.0 | 3.0 | 3.0 |
| Barium Sulfate | 15.0 | 15.5 | 14.0 | 13.0 | 11.0 | 6.0 | 20.5 | 20.0 | 6.0 |
| Total | 100.0 | 100.0 | 100.0 | 100.0 | 100.0 | 100.0 | 100.0 | 100.0 | 100.0 |

TABLE 2

| | Embodiments | | | | | Comparative Examples | | |
|---|---|---|---|---|---|---|---|---|
| | 10 | 11 | 12 | 13 | 14 | 1 | 2 | 3 |
| Aralkyl Modified Phenolic Resin (Phenol Aralkyl Resin) | 4.0 | 4.0 | 4.0 | 4.0 | 4.0 | 4.0 | 4.0 | 4.0 |
| Straight Phenolic Resin | 3.0 | 3.0 | 3.0 | 3.0 | 3.0 | 3.0 | 3.0 | 3.0 |
| Copper Fiber | 0.0 | 0.0 | 0.0 | 0.0 | 0.0 | 0.0 | 0.0 | 0.0 |
| Aramid Fiber | 3.0 | 3.0 | 3.0 | 3.0 | 3.0 | 3.0 | 3.0 | 3.0 |
| Ferrous Sulfide | 17.0 | 5.0 | 5.0 | 5.0 | 5.0 | 5.0 | 5.0 | 5.0 |
| Molybdenum Disulfide | 0.0 | 0.0 | 0.0 | 0.0 | 0.0 | 0.0 | 0.0 | 0.0 |
| Resilient Graphitic Carbon | 3.0 | 3.0 | 3.0 | 3.0 | 3.0 | 0.3 | 12.0 | 0.0 |
| Petroleum Coke | 0.0 | 0.0 | 0.0 | 0.0 | 0.0 | 0.0 | 0.0 | 3.0 |
| Graphite | 2.0 | 2.0 | 2.0 | 2.0 | 2.0 | 2.0 | 2.0 | 2.0 |
| Potassium Hexatitanate (Indefinite Shape) | 17.0 | 17.0 | 17.0 | 17.0 | 17.0 | 17.0 | 17.0 | 17.0 |
| Aluminum Particle | 0.0 | 0.0 | 0.0 | 0.0 | 0.0 | 3.0 | 3.0 | 3.0 |
| Aluminum - Zinc Alloy Particle | 0.0 | 0.5 | 1.0 | 10.0 | 12.0 | 0.0 | 0.0 | 0.0 |
| Zirconium Oxide | 25.0 | 25.0 | 25.0 | 25.0 | 25.0 | 25.0 | 25.0 | 25.0 |
| Triiron Tetroxide | 7.0 | 7.0 | 7.0 | 7.0 | 7.0 | 7.0 | 7.0 | 7.0 |
| Zirconium Silicate | 1.0 | 1.0 | 1.0 | 1.0 | 1.0 | 1.0 | 1.0 | 1.0 |
| Mica | 4.0 | 4.0 | 4.0 | 4.0 | 4.0 | 4.0 | 4.0 | 4.0 |
| Pulverized Powder of Tire Tread Rubber | 2.0 | 2.0 | 2.0 | 2.0 | 2.0 | 2.0 | 2.0 | 2.0 |
| Cashew Dust | 5.0 | 5.0 | 5.0 | 5.0 | 5.0 | 5.0 | 5.0 | 5.0 |
| Calcium Hydroxide | 3.0 | 3.0 | 3.0 | 3.0 | 3.0 | 3.0 | 3.0 | 3.0 |
| Barium Sulfate | 4.0 | 15.5 | 15.0 | 6.0 | 4.0 | 15.7 | 4.0 | 13.0 |
| Total | 100.0 | 100.0 | 100.0 | 100.0 | 100.0 | 100.0 | 100.0 | 100.0 |

In the resulted friction material, the braking effectiveness and wear resistance under the high speed and high load braking conditions were evaluated. The evaluation results are shown in the TABLE 3 and TABLE 4, and the evaluation standard is shown in the TABLE 5.

TABLE 3

| | | Embodiments | | | | | | | | |
|---|---|---|---|---|---|---|---|---|---|---|
| | | 1 | 2 | 3 | 4 | 5 | 6 | 7 | 8 | 9 |
| Evaluation Result | Chipping | ◉ | Δ | ○ | ◉ | ◉ | ◉ | ◉ | ◉ | ◉ |
| | Wear Resistance | ◉ | ◉ | ◉ | ◉ | ◉ | ◉ | ○ | ○ | ◉ |
| | Agressiveness against the Facing Member | ◉ | ◉ | ◉ | ◉ | ◉ | ◉ | ○ | ○ | ○ |
| | Speed and High Load Braking Performance | ◉ | ◉ | ◉ | ◉ | ◉ | ○ | Δ | ○ | ◉ |
| | Braking Performance in the Normal Working Range | ◉ | ◉ | ◉ | ◉ | ○ | Δ | Δ | ○ | ◉ |

TABLE 4

| | | Embodiments | | | | | Comparative Examples | | |
|---|---|---|---|---|---|---|---|---|---|
| | | 10 | 11 | 12 | 13 | 14 | 1 | 2 | 3 |
| Evaluation Result | Chipping | ◉ | ◉ | ◉ | ◉ | ◉ | X | ◉ | X |
| | Wear Resistance | ◉ | ◉ | ◉ | ◉ | ◉ | Δ | ◉ | ○ |
| | Agressiveness against the Facing Member | Δ | ◉ | ◉ | ◉ | ◉ | ◉ | ◉ | ◉ |
| | Speed and High Load Braking Performance | ◉ | ○ | ◉ | ◉ | ◉ | ○ | Δ | ○ |
| | Braking Performance in the Normal Working Range | ◉ | ◉ | ◉ | ◉ | ○ | ◉ | X | ◉ |

TABLE 5

| | | | Evaluation Items | | |
|---|---|---|---|---|---|
| | Chipping | Wear Resistance | Agressiveness against the Mating Member | Effectiveness under High Speed and High Load Braking | Effectiveness in the Normal use Range |
| | | | Evaluation Method | | |
| | | JASO C406 | | | JASO C406 Second Effect Test 50 km/h → 0 km/h Hydraulic Pressure (4 MPa) |
| | auto motor und sport (AMS), German Automobile Journal High Speed Pattern | | | | |
| | Simulation Test, 150% condition 240 km/h → 5 km/h (Deceleration 0.6 G) × 1 Cycle | | | | |
| | Maximum Width of the Chipping | Amount of Wear of Friction Material | Amount of Wear of the Mating Member | Average μ min value of Final Braking | Average μ of Five Cycle |
| ◉ | none | 2.0 mm or less | 10 μm or less | 0.20 or more | 0.42 or more, less than 0.46 |
| ○ | Less than 1.0 mm | 2.0 mm or more, less than 3.0 mm | 10 μm or more, less than 15 μm | Less than 0.20, 0.15 or more | 0.38 or more, less than 0.42 |
| Δ | 1.0 mm or more, less than 5.0 mm | 3.0 mm or more, less than 4.0 mm | 15 μm or more, less than 20 μm | Less than 0.15, 0.10 or more | 0.34 or more, less than 0.38 |
| X | 5.0 mm or more | 4.0 mm or more | 20 μm or more | Less than 0.10 | Less than 0.34 |

From the evaluation results of the TABLE 3 and TABLE 4, the friction material in the embodiments, although the compositions used therein has no copper component contained or has very minor amount, if ever contained, the friction material is expected to provide sufficient evaluation results. Therefore, no practical problem can be seen in the evaluation results.

INDUSTRIAL APPLICABILITY

According to the present invention, in the friction material utilized for disc brake pad, which is manufactured by forming the NAO friction material composition, the obtained friction material, while satisfying laws relating to the required amount of the content of the copper component contained therein, can suppress the chipping of the edge of the friction material that occurs under the high speed and high load braking conditions and further can suppress the deterioration of braking effectiveness, which provides an extremely practical and valuable solution to the friction material.

What is claimed is:
1. A friction material which is a non-asbestos-organic friction material utilized for a disc brake pad, which is manufactured by forming a non-asbestos organic friction material composition that does not contain a copper component, wherein
said friction material composition contains
4-12 weight % of a binder relative to the total amount of the friction material composition, said binder consists of one or any combination of two or more items selected from the group consisting of a straight phenolic resin, a cashew oil modified phenolic resin, a silicone oil modified phenolic resin, an elastomer modified phenolic resin, an aralkyl modified phenolic resin, an elastomer dispersed phenolic resin, and a fluoropolymer dispersed phenolic resin,
7-35 weight % of a titanate relative to the total amount of the friction material composition,
0.5-10 weight % of a resilient graphitic carbon particle relative to the total amount of the friction material composition as a carbon type lubricant,
1-15 weight % of a ferrous sulfide relative to the total amount of the friction material composition as a metal sulfide type lubricant, and

1-10 weight % of an inorganic friction modifier, said modifier is one or any combination of two or more items selected from the group consisting of an alloy particle mainly containing aluminum, and an alloy fiber mainly containing aluminum relative to the total amount of the friction material composition as an inorganic friction modifier.

2. The friction material according to claim 1, wherein
said alloy particle mainly containing aluminum and said alloy fiber mainly containing aluminum are one or more items selected from the group consisting of an aluminum-zinc type alloy, an aluminum-manganic type alloy, an aluminum-silicon type alloy, an aluminum-magnesium type alloy, an aluminum-magnesium-silicon type alloy, and an aluminum-zinc-magnesium type alloy.

* * * * *